March 20, 1934.  C. DE MARCO  1,951,473
CAMERA
Filed Aug. 16, 1929  2 Sheets-Sheet 1

Inventor
CHARLES DE MARCO
By Frank Keifer
Attorney

March 20, 1934.  C. DE MARCO  1,951,473

CAMERA

Filed Aug. 16, 1929  2 Sheets-Sheet 2

Inventor
CHARLES DE MARCO
By Frank Keifer
Attorney

Patented Mar. 20, 1934

1,951,473

UNITED STATES PATENT OFFICE 1,951,473

CAMERA

Charles De Marco, Rochester, N. Y.

Application August 16, 1929, Serial No. 386,472

2 Claims. (Cl. 242—71.)

The object of this invention is to provide a new and improved form of camera, one that will have the appearance of a Bible or some other book, and in which it is possible to insert the film spools more easily.

Another object of the invention is to provide an improved lens front which will swing back on its support to an idle position inside of the camera when the front of the camera is closed up.

Another object of the invention is to provide an improved form of shutter and a tripping device for operating it.

These and other objects of the invention will be illustrated in the drawings, described in the specification and pointed out in the claims at the end thereof.

In the drawings, Fig. 1 is an end elevation of the camera with the camera front extended and the lens front erected.

In the drawings like reference numerals indicate like parts.

Figure 1:
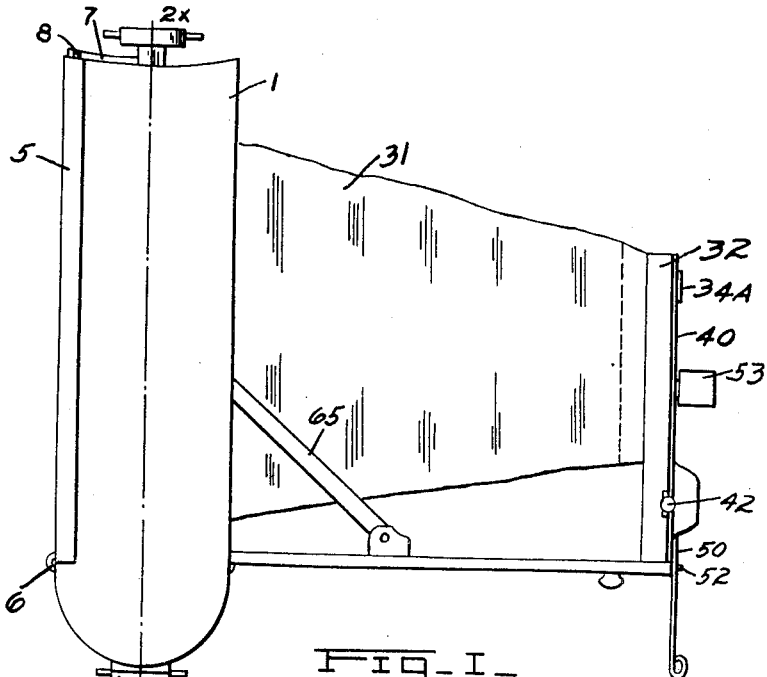

In the drawings reference numeral 1 indicates the box or case of the camera in which there are two film compartments 2 and 3 and the bellows compartment 4. All of these compartments are closed by the back door 5 of the camera which is hinged at 6 and is locked by the latch 7 which has an eye in the end thereof and engages over the pin 8 carried on the edge of the door.

Figure 2:
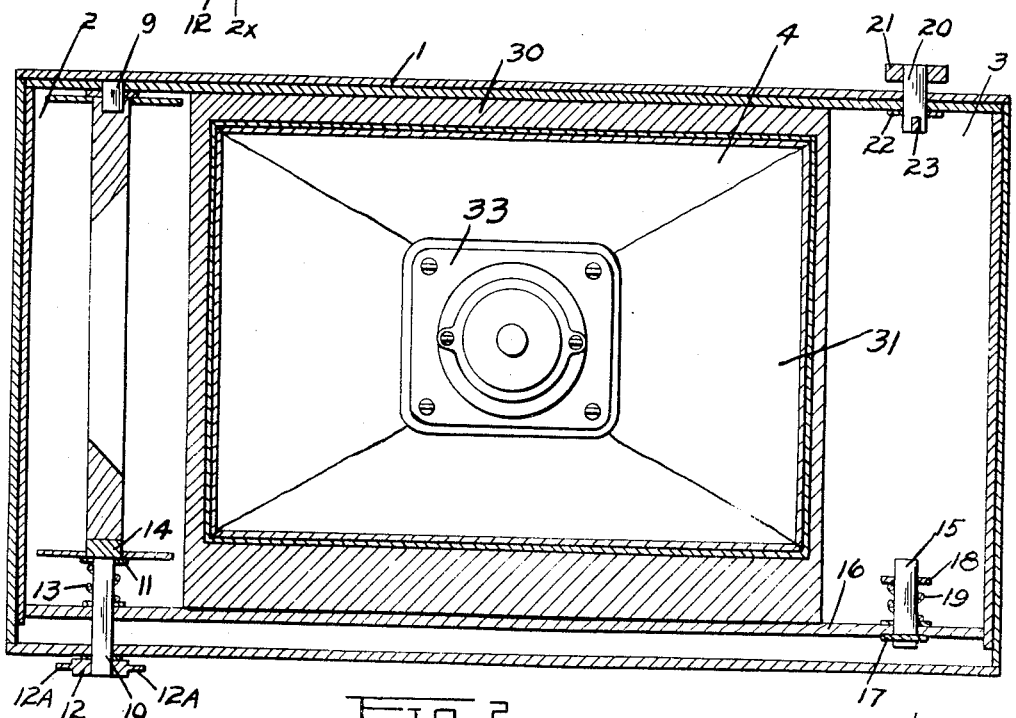
Fig. 2 is a longitudinal section thru the camera on the line 2x—2x of Fig. 1.

In the film compartment 2 on one side is provided the stationary stud 9 on which one end of the film spool engages and on which it revolves. On the other side of the film compartment is provided a stem 10 having a plate 11 thereon with a spring surrounding the stem and bearing against the plate at one end and against the wooden back 16 at the other end. The stem 10 extends through the case of the camera and carries a knurled wheel 12 on the outer end thereof. This wheel may be provided with spokes 12A to make it the more easily turned. The expansion of the spring 13 holds the stem normally in the position shown in Figure 2. The inner end of the stem is provided with a key 14 that extends across it outside of the plate 11 which is adapted to engage the slot in the end of the spool so that the spool may be turned by the knurled wheel 12.

The film is placed in position by tilting it so that one end is applied to the stem 10 and the stem 10 is pushed down by the spool. The upper end of the spool is swung in to the compartment until the central axis of the spool is in line with the stud 9. Thereupon the expansion of the spring 13 will move the stem 10 and push the spool into engagement with the stud 9.

The spool is removed by pressing down on the rim of one flange of the spool so as to press down the stem and compress the spring. This will cause the upper end of the spool to disengage from the stud and swing out, after which the spool can be removed.

In the compartment 3 a stem 15 is provided which extends through the wood backing 16. It is provided with a pin 17 that extends out on either side of the stem 15 and engages with the wooden back 16. The stem 15 is provided with a plate 18 that is rigidly fastened thereon and the spring 19 surrounds the stem and presses against the plate 18 at one end and against the wooden back at the other end and normally holds the stem in the position shown in Figure 2 with the pin 17 drawn up against the lower side of the wooden back 16. The top of the stem 15 is round so that the film spool can turn thereon. At the other end of the compartment 3 is provided a stem 20 having a knurled wheel 21 on the outer end thereof and having a washer 22 therein. Inside of the casing the inner end of the stem 20 is slotted and fastened therein is a key 23 that is adapted to engage in the slot in the inner end of the spool so that the spool may be turned thereby. The knurled wheel 12 is adapted to turn its spool and draw the film in one direction and the knurled wheel 21 is adapted to turn its spool and draw the film in the other direction. By this means the film can be removed in either direction.

A frame 30 is provided in the camera to which is attached the bellows 31, which bellows extends forwardly as shown in Figure 1. The forward end of the bellows is turned down over the cell 33 that carries the lens and the bellows is clamped between it and the back of the plate 32.

The shutter 38 is pivotally mounted to swing on the plate 32. This shutter carries an opening 41 therein which swings directly across the center of the lens and across the opening in the diaphragm placed in front of the lens. It is moved by the sliding bar 42 which extends outside of the lens front at both ends so that it can be pushed or pulled in either direction. This bar slides in guides 43 and 44 provided on the rear plate 32. Fastened centrally to this bar is one end of the small coiled wire spring 45, the other end of which is fastened to the shutter at the point 46. The expansion of the spring will normally hold the shutter at the one or the other end of its movement. As the bar is moved the spring is flexed so as to throw the shutter from one end of its movement to the other end of its movement, the shutter always moving in the direction opposite to the movement of the bar.

Figure 3:
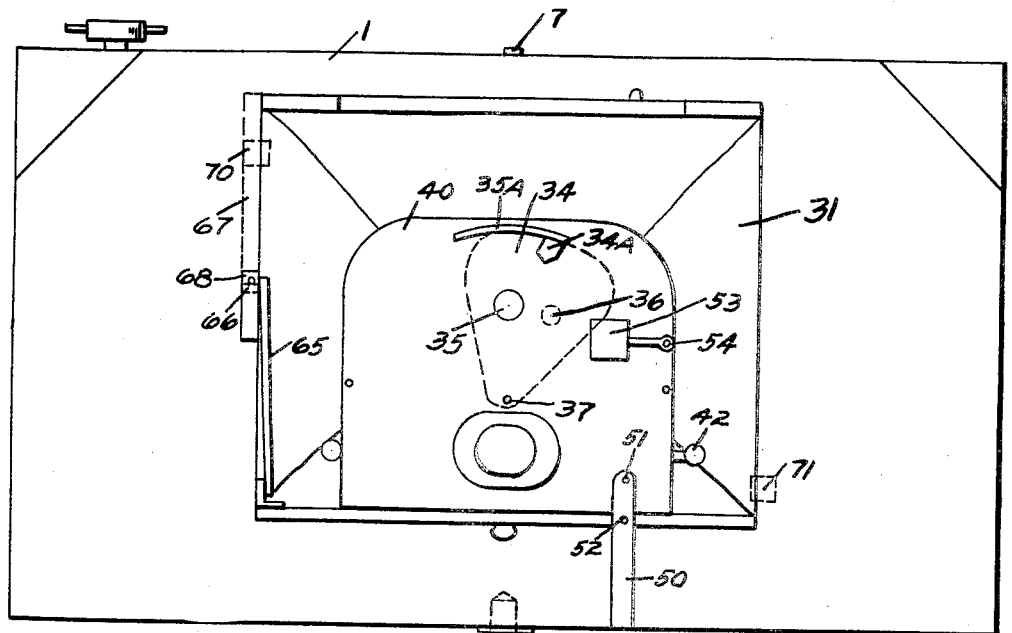
Fig. 3 is a front elevation of the camera as viewed from the right in Figure 1.
Figure 4:
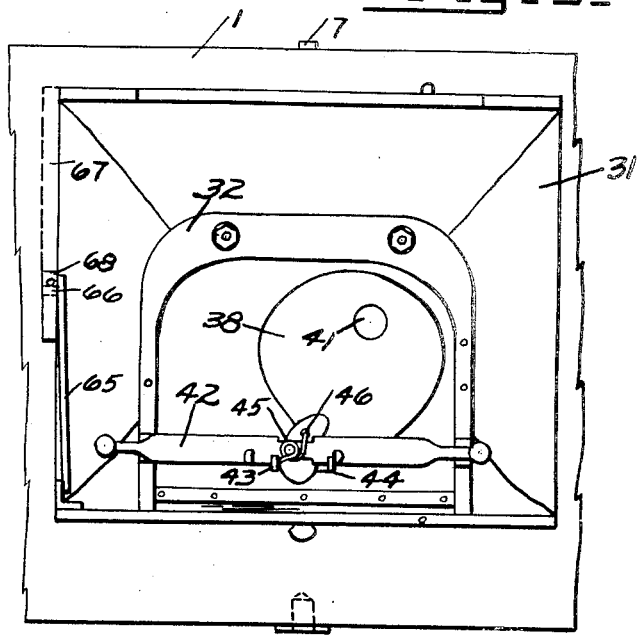
Fig. 4 shows the lens front and bellows of the camera with the cover plate of the lens front removed.
Figure 5:
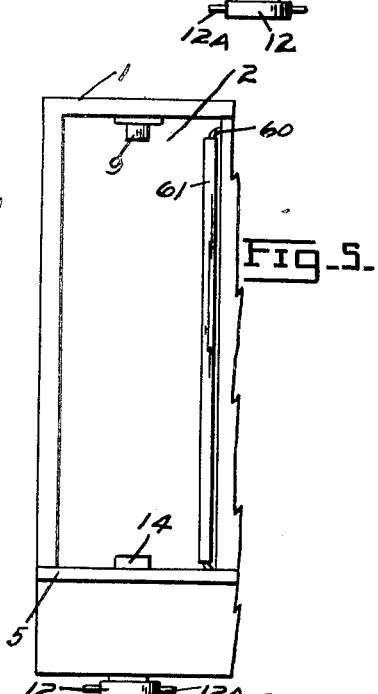
Fig. 5 is a rear view of one of the film compartments as it appears with the back door of the camera open.

The front plate 40 carries the diaphragm plate 34 which is shown in dotted lines in Fig. 3. This plate 34 is provided with two diaphragm openings 35 and 36 of different diameters. This plate 34 swings on the pivot 37 and it can be placed either in the position shown in Figure 3 with the opening 35 central with the lens or it can be moved to the left so as to bring the opening 36 central with the lens. In this way a large or a small amount of light can be admitted to the lens.

The plate is provided with an extension or handle 34A that extends through a slot 35A and is exposed on the lens front so that the diaphragm plate can be moved thereby to the one position or the other. As shown in Fig. 3 the large opening 35 of diaphragm is concentric with the center of the lens. When the plate 34 is moved to the left the small opening 36 will be concentric with the center of the lens.

To the lens front is attached a foot rest 50 which rest is pivoted at 51 to the lens front. This foot rest has an opening 52 therein which engages with a pin on the outer edge of the door and serves to lock the upper end of the lens front in an upright position as well as to form a rest for the front of the camera. A finder 53 is also provided pivoted on the lens front at 54.

In each film compartment I provide a bail 60 on which is mounted a roller 61 over which the film travels as it moves either in or out of the compartment.

Pivotally attached to the door is a link 65 which at its upper end carries the pin 66 that moves in the slot 67 provided in the frame 30. A spring pressed latch 68 is provided which engages over the pin 66 when the link 65 is in the position shown in Fig. 1. This latch can be raised to release the pin when it is desired to close up the camera.

In the back of the camera I provide the sight openings 70 and 71 through which the paper that covers the film may be viewed so that the position of the film may be determined as the film is moved forward or back.

I claim:

1. A camera having a case, a film spool compartment at each end thereof, a bail on one side of said compartment, a roller mounted to rotate on said bail, said roller being adapted to support the film as it passes in or out of the compartment, the ends of said bail being adapted to hold the roller against endwise movement.

2. A camera having a case, a film spool compartment at one end thereof, a stem mounted in one end of said compartment, said stem passing through a wall of the camera case, a spring surrounding said stem, a flange on the inner end of said stem against which one end of said spring bears, the other end of said spring bearing against the inside of the camera case, said stem being adapted to move endwise to permit the insertion or removal of a spool of film, said camera case having a recess therein into which said stem is adapted to move endwise.

CHARLES DE MARCO.